United States Patent [19]

Takeuchi et al.

[11] Patent Number: 4,809,426
[45] Date of Patent: Mar. 7, 1989

[54] INFORMATION PROCESSING APPARATUS OF TOOL HOLDER

[75] Inventors: Kunihiko Takeuchi, Kawasaki; Hiroshi Nogi, Yokohama, both of Japan

[73] Assignee: Tokyo Keiki Company, Ltd., Tokyo, Japan

[21] Appl. No.: 924,342

[22] Filed: Oct. 24, 1986

[30] Foreign Application Priority Data

Nov. 20, 1985 [JP] Japan .................. 60-260384

[51] Int. Cl.⁴ ............................. B23Q 3/155
[52] U.S. Cl. ........................... 29/568; 40/626; 40/628; 40/913; 279/1 TS; 365/64; 365/66; 365/170; 365/221; 365/229; 409/234
[58] Field of Search .......... 29/568; 40/625, 626, 40/628–631, 913; 279/1 TS; 409/80, 234; 365/63, 64, 66, 221, 229, 170

[56] References Cited

U.S. PATENT DOCUMENTS

| | | | |
|---|---|---|---|
| 3,173,204 | 3/1965 | Anthony | 29/568 |
| 4,014,275 | 3/1977 | Herr et al. | 365/170 X |
| 4,449,206 | 5/1984 | Tokitsu et al. | 365/229 |
| 4,588,339 | 5/1986 | Bilz | 29/568 X |
| 4,720,907 | 1/1988 | Rapp | 29/568 |

FOREIGN PATENT DOCUMENTS

| | | | |
|---|---|---|---|
| 111693 | 10/1983 | European Pat. Off. | 29/568 |
| 155662 | 9/1985 | European Pat. Off. | 29/568 |

Primary Examiner—Gil Weidenfeld
Assistant Examiner—Steven C. Bishop
Attorney, Agent, or Firm—Wenderoth, Lind & Ponack

[57] ABSTRACT

A memory is built in a tool holder to which a working tool such as drill or the like is attached. Various tool information such as kind of tool, dimensions of tool, tool use time, and the like is written into the memory. The tool holder having the memory therein is coupled with an external unit by contactless coupling means which doesn't need any electrical coupling, thereby allowing the tool information to be written into or read out of the memory. The information is transmitted between the memory in the tool holder and the external unit by way of the optical or magnetical coupling. The memory built in the tool holder consists of a non-volatile memory such that the memory content is not erased even if the power supply is shut off.

13 Claims, 7 Drawing Sheets

INFORMATION PROCESSING APPARATUS OF TOOL HOLDER

BACKGROUND OF THE INVENTION

The present invention relates to an information processing apparatus of a tool holder in which a working tool such as drill, cutter, or the like is attached to the tool holder and this tool holder itself has information and, more particularly, to an information processing apparatus of a tool holder in which the tool holder itself has the information regarding the automatic tool exchange control such that an arbitrary tool is selected from a number of tools attached to the tool holder and the selected tool is attached to or detached from a machine tool in accordance with the working sequence by the program control.

Hitherto, in the machine tools such as machining centers and the like, tools are exchanged by the automatic tool exchanging apparatus.

FIG. 1 shows an example of a machining center having an automatic tool exchanging apparatus. An automatic tool exchanging apparatus 10 has a rotatable belt mechanism 12. A number of racks 14 to enclose tools are provided for the belt mechanism 12. For example, as shown in FIG. 2, a holder (standard article) 18 to which a working tool 16 such a drill or the like is attached is inserted into the rack 14. When the number of rack having a desired tool to be exchanged is designated by the side of a machining center 20, the belt mechanism 12 is driven to carry the designated rack to the detaching position where an exchanging robot 22 is arranged. The tool holder inserted into the designated rack is taken out by a robot arm 24A and moved to the position of a spindle 26 of the machining center 20. The tool attached to the spindle 26 is removed therefrom by the other robot arm 24B. Thereafter, the arm is rotated and the new tool is attached to the spindle 26.

However, in the case of exchanging the tools by use of such an automatic tool exchanging apparatus, a desired tool to be exchanged is selected by designating the rack number. Therefore, the rack numbers and the tool numbers must be set into the automatic tool exchanging apparatus in a one-to-one corresponding relation manner.

Thus, the tool number which is designated by the machining center means that, for example, when the tool No. 5 is designated, the rack No. 5 in the automatic tool exchanging apparatus is designated; therefore, it is impossible to directly designate the kind of tool with respect to whether the tool is the drill or cutter.

Therefore, in the case where the tool enclosed in the automatic tool exchanging apparatus is exchanged because of the damage or for the purpose of grinding, the new tool must be certainly attached to the rack of the predetermined number. Although the tools attached to the racks near the exchanging robot 22 can be relatively easily exchanged, the tools disposed at the positions of the other racks are exchanged in the state in which the operator enters the narrow place since a wide space cannot be assured. In particular, some of the working tools are considerably heavy, so that the tool exchanging work is severe.

On the other hand, to solve the problem of the tool exchange in the case where there is the one-to-one corresponding relation between the rack numbers and tool numbers, for example, as shown in FIG. 3, there is known the tool holder such that a plurality of magnets 29 indicative of the tool number are embedded in the attaching tapered surface 28 of the tool holder 18.

By use of the tool holder 18 having the tool number by the embedded magnets, after the tools attached to the holder were inserted at random into the racks 14 of the automatic tool exchanging apparatus 12 shown in FIG. 1, the tool numbers by the embedded magnets are previously read and stored by performing the learning process such that the exchanging operations of the tools from all of the racks 14 are executed once. In this manner, the relation between the rack numbers and the tool numbers is derived as the table data. Therefore, by designating the tool number on the basis of the table data, the tool of the rack number corresponding to the designated tool number can be selected and exchanged.

On the other hand, even in the case of exchanging the tool because of the damage or for the purpose of grinding, if the same tool holder is used, by attaching a new tool to the idle rack existing at the position where the exchanging operation can be easily performed without considering the rack number and by executing the learning process in a manner similar to the foregoing case, the tools can be exchanged without being restricted by the rack number.

However, in the case of the tool holder having the tool number by the embedded magnets as mentioned above, there is the limitation of the number of magnets which can be embedded into the holder. Therefore, an amount of information which can be provided for the holder is small and, therefore, the tools cannot be sufficiently managed on the basis of the holder information.

In addition, since the embedding positions of the magnets are substantially fixed, it is practically difficult to change the tool number and the like, so that the holder to be used is predetermined for every tool in a one-to-one corresponding relation manner. A special holder cannot be used to attach another different tool. Consequently, there are the problems such that it is necessary to stock the holder having the same embedded magnets to exchange the tools and it is complicated to manage the holders themselves.

SUMMARY OF THE INVENTION

It is an object of the present invention to provide an information processing apparatus of a tool holder in which not only the tool number but also various information necessary to exchange the manage the tool are stored and held in the holder itself, and the tools can be properly exchanged and managed by the data processor on the side of a machine tool such as a machining center or the like without being restricted by the rack number and tool number and the like of an automatic tool exchanging apparatus.

Another object of the invention is to provide an information processing apparatus of a tool holder in which a memory to store various data is provided in the holder itself and the data can be freely read out and written between the memory and an external unit by the data transmission.

Still another object of the invention is to provide a tool holder in which even if a power supply from the outside is shut off, the content stored in the memory is not erased but can be held.

Still another object of the invention is to provide an information processing apparatus of a tool holder in which the data can be written into and read out of the memory without needing the electrical connection with the outside.

Still another object of the invention is to provide an information processing apparatus of a tool holder having an external unit to write and read the information from the outside into and from the memory provided in the tool holder.

According to the present invention, the tool holder itself which is known as a standard article has therein a writable non-volatile memory to store various information regarding the tool attached to the holder, and a contactless coupling apparatus adapted to perform an optical or magnetical coupling is also provided in order to read out and write the information between the memory and the external unit by the serial data transmission.

The above and other objects, features, and advantages of the present invention will become more apparent from the following detailed description in conjunction with the accompanying drawings.

BRIEF DESCRIPTION OF THE DRAWINGS

FIG. 10 is a block diagram showing still another embodiment of the invention in which a battery is built in.

DETAILED DESCRIPTION OF THE PREFERRED EMBODIMENTS

Figure 4:
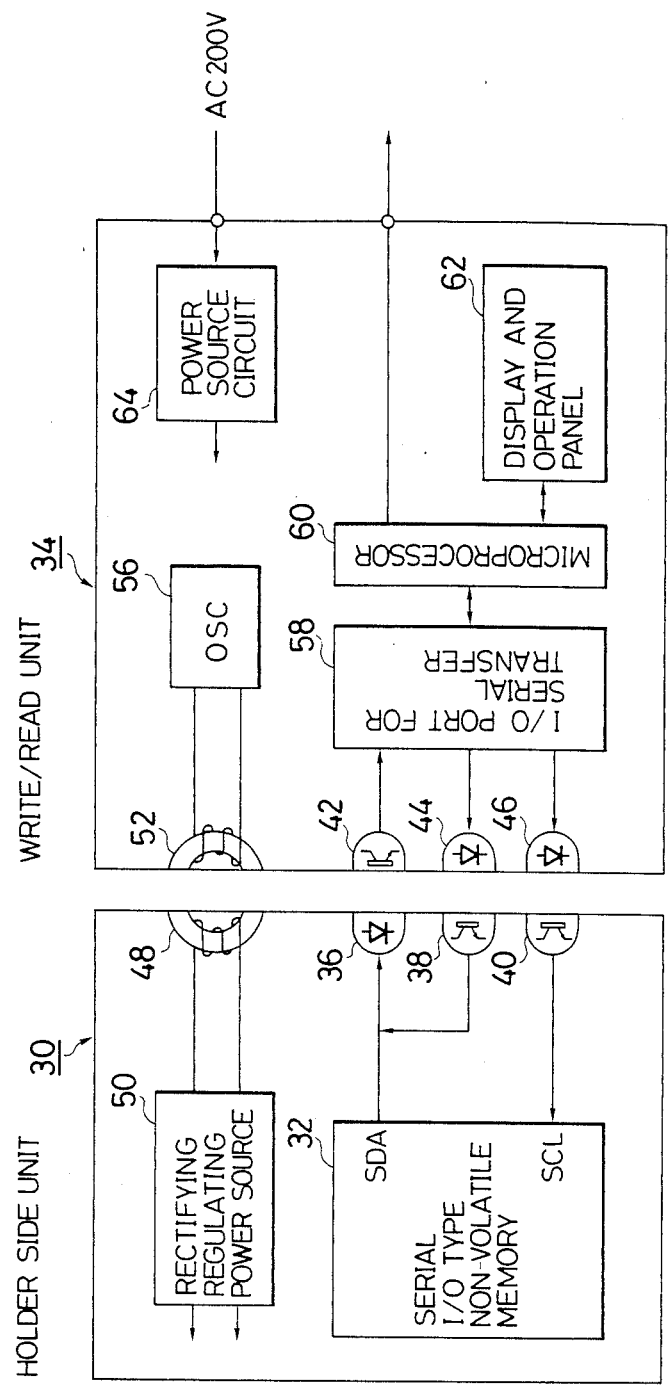
FIG. 4 is a block diagram showing an embodiment of the present invention.

FIG. 4 is a block diagram showing an embodiment of the present invention.

A constitution will be first explained. A holder side unit 30 is built in a tool holder. The unit 30 has a non-volatile memory 32 of the serial input/output (I/O) type to store various kinds of information with respect to the tool attached to the holder. As the memory 32, for example, an EEPROM (Electrically Erasable Programmable Read Only Memory) which can electrically re-write the memory content may be used. Practically speaking, X2404 made by Xicor Co., Ltd. can be used. The serial I/O type non-volatile memory 32 has a serial data port SDA and a serial clock port SCL. With regard to the data writing operation, for example, the data can be written by serially inputting the address and data synchronously with a clock, in which these address and data consist of a start pulse, an R/W pulse to switch the reading and writing operations, an address, data, and an end pulse as shown in FIG. 5.

Figure 5:
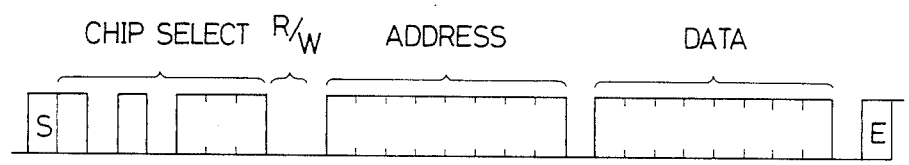
FIG. 5 is an explanatory diagram of a format of write/read data in a memory provided in a holder.

When the address is designated synchronously with a clock by using the R/W pulse shown in FIG. 5 as a reading mode, the data in the designated address can be similarly read out as the serial data to the outside synchronously with the clock subsequent to the address designation.

Further, the memory capacity of the memory 32 is, for example, 8×512 bytes and is so sufficient that the memory can store various kinds of information regarding the tool such as, for example, tool number, kind of tool, dimensions of tool, use time of tool, and the like.

Referring again to FIG. 4, by use of the serial data port SDA and serial clock port SCL of the memory 32, data is written into and read out of a write/read unit 34, which is provided as an external unit. For this purpose, a contactless coupling apparatus using photocouplers is provided.

Namely, the holder side unit 30 and the write/read unit 34 are separately provided. Three sets of photocouplers each consisting of a combination of a light emitting diode and a phototransistor are provided for the units 30 and 34. The side of the holder side unit 30 is provided with a light emitting diode 36 and two phototransistors 38 and 40. The light emitting diode 36 transmits the address and data pulses from the serial data port SDA of the memory 32 to the outside. The phototransistor 38 receives the address and data pulses from the side of the write/read unit 34 and supplies to the serial data port SDA. The phototransistor 40 receives the clock pulse from the side of the write/read unit 34 and supplies to the serial clock port SCL.

The side of the write/read unit 34 is provided with a phototransistor 42 and two light emitting diodes 44 and 46 so as to face the light emitting diode 36 and phototransistors 38 and 40 of the holder side unit 30, respectively. The phototransistor 42 receives the address and data pulses from the holder side unit 30. The light emitting diode 44 transmits the address and data pulses to the holder side unit 30. The light emitting diode 46 transmits the clock pulse to the holder side unit 30.

The holder side unit 30 further has a transformer 48 of a part-winding structure and a rectifying regulating power source 50. The transformer 48 is supplied with a power source from the side of the write/read unit 34 by way of a contactless coupling system and produces a power source for the memory side. The rectifying regulating power source 50 rectifies an AC output voltage of the transformer 48 and generates a constant DC voltage for the memory. On the other hand, in correspondence to the power transformer 48 built in the holder side unit 30, a power tansformer 52 having a part-winding structure in which the primary winding is wound is also built in the side of the write/read unit 34 so as to face the transformer 48. An AC voltage of a predetermined frequency is supplied from an oscillator 56 to the primary winding of the power transformer 52.

A magnetic circuit of a transformer core is formed by confronting the power transformers 48 and 52 which are divided on both sides of the units 30 and 34 so as to mutually face as shown in the diagram. Thus, the induction magnetic field which is generated by supplying the AC voltage from the oscillator 56 to the primary winding is transferred to the transformer core of the holder side unit 30, thereby enabling the induced power voltage to be generated in the secondary winding.

Further, the write/read unit 34 has therein and I/O port 58 for serial transfer to perform the serial data transfer in order to write or read the data into or from the memory 32 in the holder side unit 30. The I/O port 58 is connected to a microprocessor 60. A display and operation panel 62 as an external I/O apparatus is further connected to the microprocessor 60. The microprocessor 60 controls the writing or reading operation of various information concerned with the tool through the serial transfer I/O port 58 on the basis of the operation of a keyboard of the display and operation panel 62. The write/read unit 34 also has a power source circuit 64 supplied with a commercially available power source, thereby allowing a constant DC power voltage to be supplied to each circuit section in the unit 34.

Figure 6A:
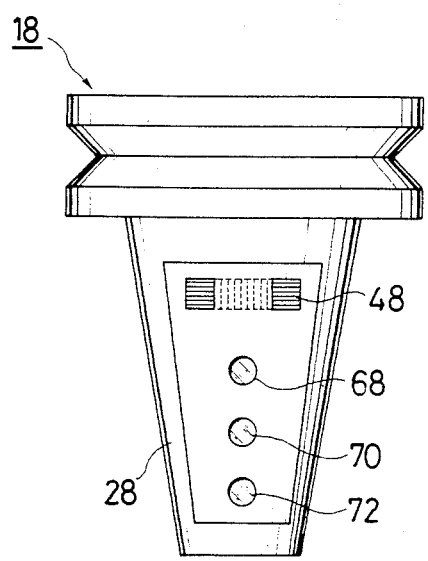
FIGS. 6A and 6B are explanatory diagrams showing an embodiment of a built-in state in a tool holder.
Figure 6B:
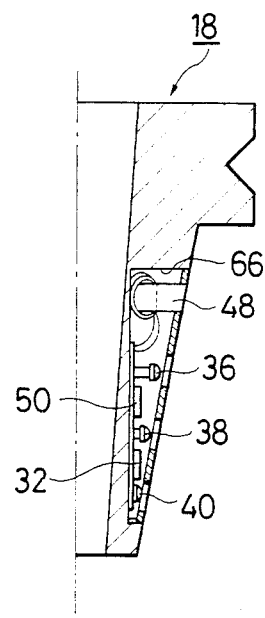

FIG. 6A is an explanatory diagram of the tool holder having the holder side unit 30 shown in FIG. 4 therein. FIG. 6B shows a cross sectional view of the built-in portion of the holder side unit.

In the embodiment of FIGS. 6A and 6B, the holder side unit 30 shown in FIG. 4 is built in the conical-shaped holder attaching portion 28 of the tool holder 18. As will be obviously understood from FIG. 6B, a recess portion is hollowed out in the holder attaching portion 28 to form a unit enclosing portion 66. The memory 32, power source 50, light emitting diode 36, photoresistors 38 and 40, and power transformer 48 are enclosed in the unit enclosing portion 66.

As shown in FIG. 6A, the cross sectional surface of the core of the power transformer 48 is exposed to the surface of the holder attaching portion 28. Transparent windows 68, 70, and 72 into which hard glasses or the like are inserted are attached to the surface portions which face the light emitting diode 36 and phototransistors 38 and 40, respectively.

Figure 7A:
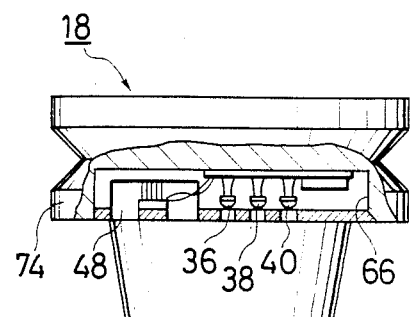
FIGS. 7A and 7B are explanatory diagrams showing another embodiment of a built-in state of a tool holder.
Figure 7B:
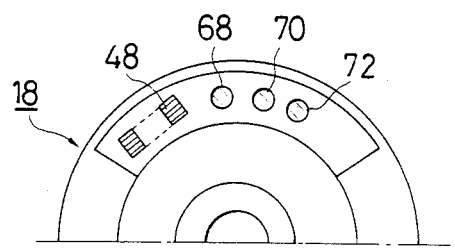

FIG. 7A is an explanatory diagram showing another embodiment of a built-in structure of the holder side unit into the tool holder. FIG. 7B shows a plan view when the built-in structure in FIG. 7A is seen from the bottom.

This embodiment has a feature such that the holder side unit is built in a flange portion 74 of the tool holder 18. The core edge surface of the power transformer 48 and the transparent windows 68, 70, and 72 for the light emitting diode 36 and phototransistors 38 and 40 are provided at the edge surface of the flange portion.

The built-in position of the holder side unit 30 into the tool holder 18 is not limited to those in the embodiments shown in FIGS. 6A, 6B, 7A, and 7B but can be built in a proper position in the holder.

Figure 8:
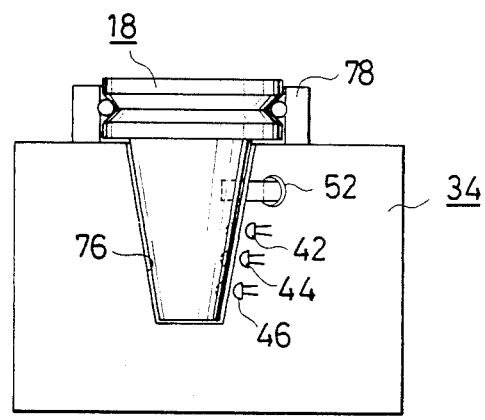
FIG. 8 is an explanatory diagram showing a combination state of a tool holder and an external unit shown in FIG. 4.

FIG. 8 is an explanatory diagram showing an embodiment of a combination state of the tool holder 18 into which the holder side unit 30 is built in and the write/read unit 34 shown in FIG. 4.

For example, assuming that the holder side unit 30 was built in the tool holder 18 as shown in FIGS. 6A and 6B, a conical-shaped enclosing hole 76 adapted to attach the tool holder 18 is hollowed out in the surface of the casing of the write/read unit 34. The tool holder 18 is inserted into the enclosing hole 76 as shown in FIG. 8. In this state, the power transformer 52, phototransistor 42, and light emitting diodes 44 and 46 on the side of the write/read unit 34 are arranged so as to face the power transformer 48, light emitting diode 36, and phototransistors 38 and 40 on the side of the holder side unit 30, respectively. By inserting the tool holder 18 into the enclosing hole 76 and fixing thereto by a clamp 78, the coupling apparatuses of both units 30 and 34 are relatively unconditionally positioned.

Figure 1:
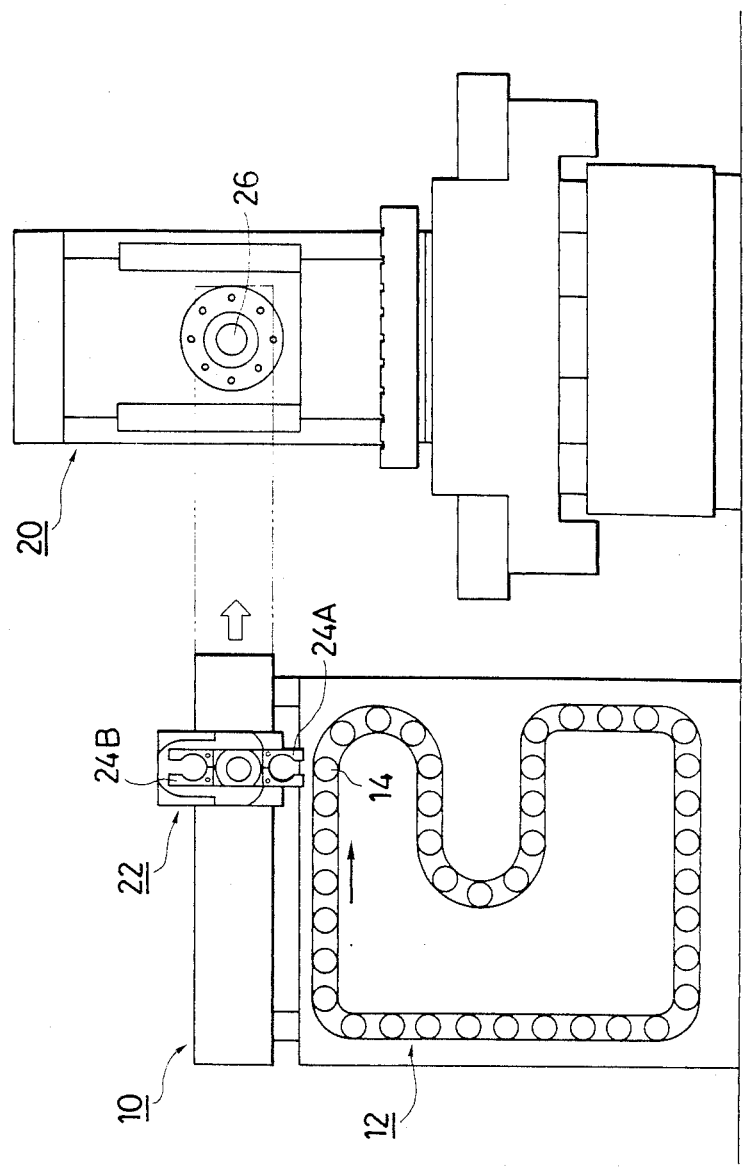
FIG. 1 is an explanatory diagram of a machining center having an automatic tool exchanging apparatus.
Figure 2:
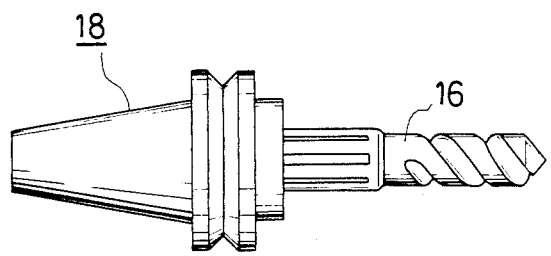
FIG. 2 is an explanatory diagram of a conventional tool holder.
Figure 3:
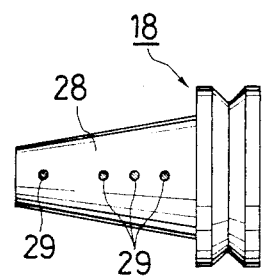
FIG. 3 is an explanatory diagram of a conventional tool holder in which magnets are embedded.

The write/read unit 34 shown in FIG. 8 is provided as an independent unit separately from the automatic tool exchanging apparatus 10 shown in FIG. 1. When the abraded or damaged tool was replaced by a new tool, the write/read unit 34 is used to clear the initial dimensions and use time of the tool.

The write/read unit 34 having the structure shown in FIG. 8 is also provided for the automatic tool exchanging apparatus or on the side of the machine tool such as a machining center or the like. For example, when the write/read unit 34 is set into the automatic tool exchanging apparatus, the tool attached to the tool holder having the memory therein according to the invention is enclosed into the rack adapted to enclose the tool. In this state, the data stored in the memory is read out by the learning operation and transferred to the side of the machining center. On the basis of the information of the tool holder, the machining center executes the selecting process to exchange the tools, counting process of the tool use time, the correcting operation of the tool processing set position for a work piece in association with the tool exchange, and the like.

Figure 9:
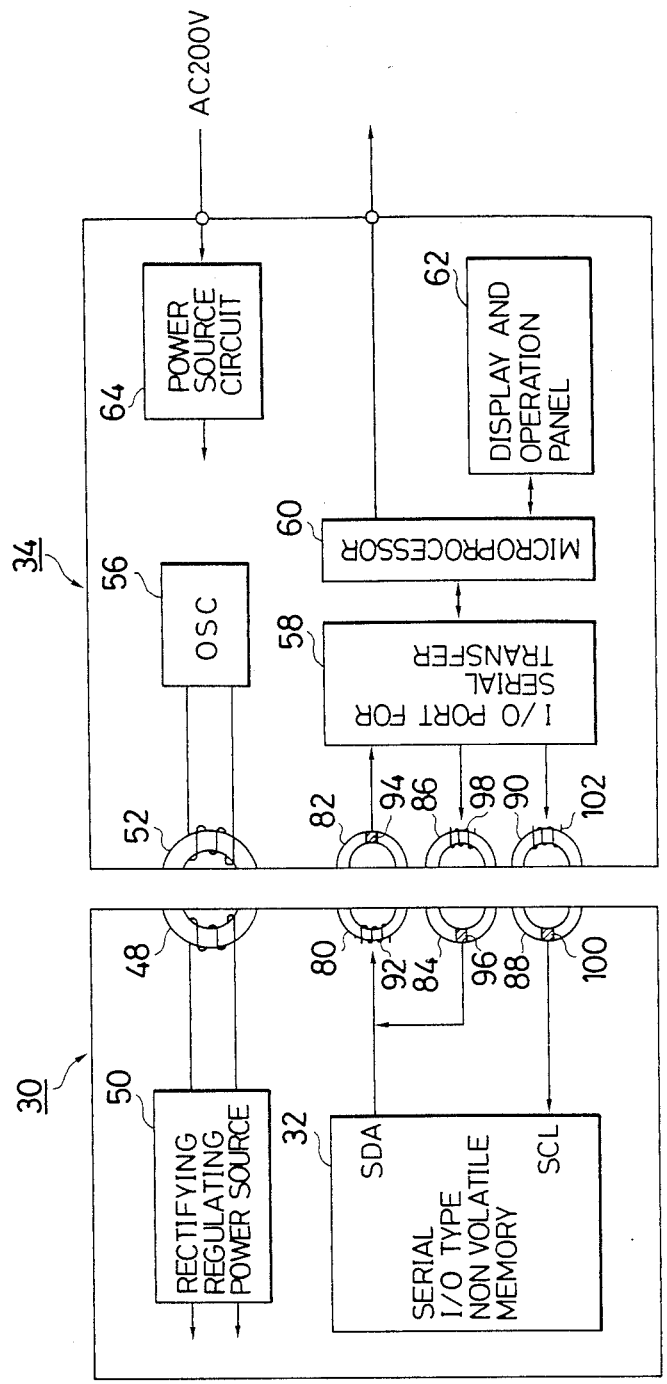
FIG. 9 is a block diagram showing another embodiment of the invention.

FIG. 9 is a block diagram showing another embodiment of the present invention. This embodiment has a feature such that a magnetic inductive coupling apparatus is used as a contactless coupling apparatus between the holder side unit 30 built in the tool holder and the write/read unit 34 as the external unit. Namely, in place of the photocouplers shown in the embodiment of FIG. 4, magnetic cores 80 and 82, 84 and 86, and 88 and 90 each having a part-winding structure are arranged between the memory 32 in the holder side unit 30 and the I/O port 58 in the write/read unit 34 so as to face each other, respectively. The magnetic core 80 is used to transmit the address and data pulses from the serial data port SDA of the non-volatile memory 32. Therefore, an induction coil 92 to be driven by the address and data pulses is rewound. The magnetic core 82 on the side of the write/read unit 34 which faces the induction coil 92 is equipped with a magnetic sensor 92 such as Hall device, magneto-resistance device, or the like.

Further, since the magnetic cores 84, 86, 88, and 90 are used to transmit the address, data pulses, and clock pulse from the side of the write/read unit 34, induction coils 96 and 98 are wound to the magnetic cores 86 and 90 in the write/read unit 34, respectively, and magnetic source 100 and 102 each consisting of Hall device, magneto-resistance device, or the like are attached to the magnetic cores 84 and 88 in the holder side unit 30, respectively.

The other circuit constitution is the same as the embodiment shown in FIG. 4.

As described above, according to the embodiment of FIG. 9, the data transfer between the memory 32 in the holder side unit 30 and the write/read unit 34 is performed by the contactless coupling structure based on the magnetic induction. Therefore, as compared with the contactless coupling apparatus using photocouplers shown in FIG. 4, even if a lubricating oil and the like are deposited to the tool holder and the holder is polluted while the tool holder is being used, the serial data transfer can be certainly performed between the holder side unit 30 and the write/read unit 34 without causing any transmission loss of data due to the deposition of oil.

Figure 10:
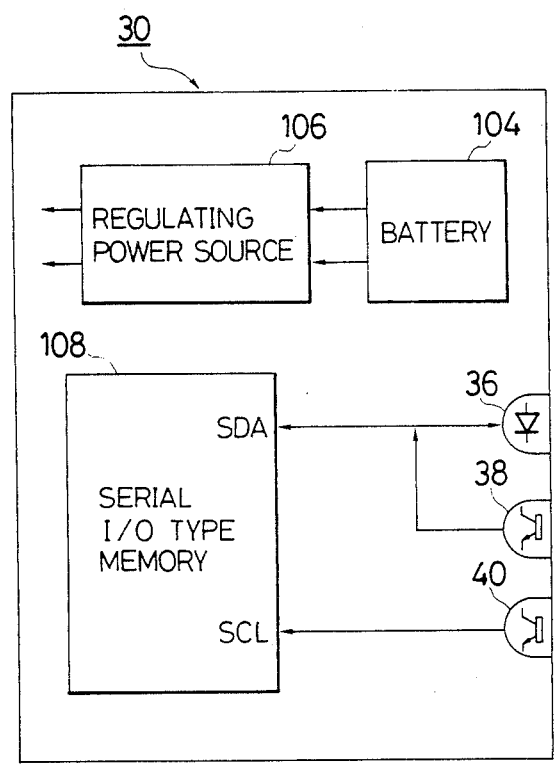

FIG. 10 is a block diagram showing still another embodiment of the invention. This embodiment has a feature such that a battery is built in the holder side unit 30 in order to hold the content stored in the memory built in the tool holder.

Namely, a battery 104 having a long service life such as mercury battery or lithium battery is built in the holder side unit 30. The battery voltage from the battery 104 is regulated by a regulating power source 106 to a constant voltage and the regulated power voltage is supplied to the unit circuit including the memory.

Since the battery 104 is built in as the power source, there is no need to use such a non-volatile memory as shown in the foregoing embodiments as a serial I/O type memory 108. Instead of this, the data is written and read out by use of an ordinary CMOS-RAM and the memory content can be held by the supply of the power source by the battery 104.

The embodiment shown in FIG. 10 relates to the example in the case of using the contactless coupling apparatus by the photocouplers similarly to the embodiment in FIG. 4. However, similarly, even in the case of using the contactless coupling apparatus by the magnetic induction shown in FIG. 9, the function as the non-volatile memory can be realized using an ordinary CMOS-RAM by providing the battery 104 in the holder side unit 30.

As described above, according to the invention, the tool holder itself has therein the memory to store various kinds of information regarding the tool attached to the holder and the contactless coupling apparatus to optically or magnetically read and write the information between the memory and the external unit by way of the serial data transfer. Therefore, a large amount of data necessary to exchange and manage the tools can be written and stored into the memory built in the tool holder. In addition, since the built-in memory is non-volatile, the stored data will not be extinguished even if the memory is used for a long time. Various tool data such as dimensions of tool concerned with the length and radius and the like, use time of tool, and the like can be stored and held for every tool. Thus, the tools can be fairly efficiently maintained and managed.

On the other hand, there is no need to present any special corresponding relation between the tools to be attached and the side of the tool holders. If different tool was attached to the tool holder, by rewriting the tool number and various data stored in the built-in memory, the proper tool holder can be freely used irrespective of the kind of tool.

Further, since there is no limitation by the rack number in the automatic tool exchanging apparatus, the tool attached to the holder can be inserted into the idle rack existing at the location where the tool can be easily attached and detached. After the new tool was inserted, the information stored in the memory in the holder at the position of the rack into which the new tool was inserted is read out on the side of the automatic tool exchanging apparatus, so that the corresponding tool can be easily selected by a command from the machining center.

Moreover, according to the tool holder of the invention, not only the power source is unnecessary but also the electrical connection with the external unit side is necessary. By merely positioning the holder side unit and write/read unit to the locations where both units optically or magnetically face each other, the data can be read and written from and into the memory built in the tool holder by the external unit. Even when the electrical circuit including the memory is arranged in the tool holder to be used under the relatively severe use condition in which the holder will be vibrated or the oil is deposited to the holder and the like, the data can be certainly written and read out without causing any malfunction due to the deposition of the oil and dust.

We claim:

1. An information processing apparatus of a tool holder to which a working tool to be exchanged by being attached and detached to and from a machine tool by an automatic tool exchanging apparatus is attached, wherein said holder itself has therein:
a memory for storing various information regarding the tool attached to the holder;
a contactless coupling means for reading and writing the information between said memory and an external unit by way of a serial data transmission; and
a power source means for supplying power sources to said memory and said contactless coupling means; wherein said external unit is an independent portable unit, and an information writing unit for writing the information into said memory built in the tool holder is constituted by setting the tool holder into said independent portable unit.

2. An information processing apparatus according to claim 1, wherein said memory built in the tool holder is a non-volatile memory which holds the memory content even in a shut-off state of the power source.

3. An information processing apparatus according to claim 1, wherein said contactless coupling means uses a photocoupler consisting of a combination of a light emitting device and a photo sensing device, a photo sensing portion of the photo sensing device of said photocoupler is arranged on a data reception side of the tool holder and external unit so as to be exposed to the outside, and a light emitting portion of the light emitting device of the photocoupler is arranged on a data transmission side of the tool holder and external unit so as to be exposed to the outside.

4. An information processing apparatus according to claim 1, wherein said contactless coupling means uses a magnetic induction coupling apparatus consisting of a combination of a magnetic induction coil and a magnetic sensor, the magnetic sensor of said magnetic induction coupling apparatus is arranged on a data reception side of the tool holder and external unit, and the magnetic induction coil of the magnetic induction coupling apparatus is arranged on a data transmission side of the tool holder and external unit.

5. An information processing apparatus according to claim 4, wherein said magnetic sensor consists of a Hall effect device or a magneto-resistance device.

6. An information processing apparatus according to claim 1, wherein said power source means consists of a rectifying regulating power source which is built in said holder and constituted in a manner such that a power transformer is divided ito a primary side transformer and a secondary side transformer, and said primary side transformer is provided in said external unit, and said second side transformer is built in said tool holder, and wherein an AC voltage induced in the secondary side transformer due to the electromagnetic induction coupling with the primary side transformer is rectified and regulated, thereby generating a regulated DC voltage.

7. An information processing apparatus according to claim 6, wherein said external unit has an oscillator to supply an AC power signal of a predetermined frequency to a primary winding of said primary side transformer.

8. An information processing apparatus according to claim 1, wherein a battery and voltage regulating means for regulating a DC voltage of said battery are built in said tool holder as said power source means.

9. An information processing apparatus of a tool holder to which a working tool to be exchanged by being freely attached to and detached from a machine tool by an automatic tool changer is attached, comprising:

a nonvolatile memory, provided in said tool holder, for storing various information regarding the tool attached to the holder;

a contactless coupling means for reading and writing information between said nonvolatile memory and an external unit by a serial data transmission; and a power source means having a primary side partial transformer and a secondary side partial transformer which are obtained by dividing a power transformer into a primary side and a secondary side, said primary side partial transformer being provided in said external unit and said secondary side partial transformer being provided in said tool holder, and said power source means being constituted in a manner such that an AC voltage is induced in the secondary side partial transformer by an electromagnetic induction coupling of the primary side partial transformer, and a DC voltage which is obtained by regulating said AC voltage by a rectifying and regulating power source is generated, and this regulated DC voltage is supplied to said nonvolatile memory and to the contactless coupling means on the side of said tool holder in said contactless coupling means.

10. An apparatus according to claim 9, wherein said contactless coupling means includes a photocoupler consisting of a combination of a light emitting device and a photo sensing device, a photosensing portion of the photo sensing device of said photocoupler is arranged on a data reception side of the tool holder and of the external unit so as to be exposed to the outside, and a light emitting portion of the light emitting device of the photocoupler is arranged on a data transmission side of the tool holder and of the external unit so as to be exposed to the outside.

11. An apparatus according to claim 9, wherein said contactless coupling means uses a magnetic induction coupling apparatus consisting of a combination of a magnetic induction coil and a Hall effect device or a magnetic resistor, said Hall effect device or magnetic resistor is arranged on a data reception side of the tool holder and of the external unit, and said magnetic induction coil is arranged on a data transmission side of the tool holder and of the external unit.

12. An apparatus according to claim 9, wherein said external unit has an oscillator for supplying an AC voltage signal of a predetermined frequency to a primary winding of said primary side partial transformer of said power source means.

13. An apparatus according to claim 9, wherein said external unit is an independent portable unit, and an information writing unit for writing the information into said nonvolatile memory provided in the tool holder is constituted by setting the tool holder into said independent portable unit.

* * * * *